(12) United States Patent
Tsuji et al.

(10) Patent No.: US 7,824,168 B2
(45) Date of Patent: Nov. 2, 2010

(54) METHOD, APPARATUS, AND SYSTEM FOR CHANGING A MOLD IN A DIE CASTING MACHINE

(75) Inventors: Makoto Tsuji, Kanagawa-ken (JP); Hiroshi Yokoyama, Kanagawa-ken (JP); Shinya Itani, Shizuoka-ken (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/748,862

(22) Filed: May 15, 2007

(65) Prior Publication Data
US 2007/0218159 A1    Sep. 20, 2007

Related U.S. Application Data

(62) Division of application No. 11/415,193, filed on May 2, 2006.

(30) Foreign Application Priority Data
May 13, 2005 (JP) ............................... 2005-141978

(51) Int. Cl.
*B29C 49/48* (2006.01)
*B29C 49/56* (2006.01)
(52) U.S. Cl. .................. 425/192 R; 425/195; 164/341; 164/342; 249/102
(58) Field of Classification Search ............... 425/190, 425/192 R, 195; 249/102; 164/312, 341, 164/342
See application file for complete search history.

(56) References Cited
U.S. PATENT DOCUMENTS 2,424,235 A * 7/1947 Hoffer ..................... 249/53 R
3,507,012 A * 4/1970 Katashi ..................... 425/592
3,871,611 A * 3/1975 Taketa ....................... 249/102
4,064,928 A   12/1977 Wunder
4,202,522 A * 5/1980 Hanas et al. .............. 249/102
4,551,084 A * 11/1985 Lake ......................... 425/185

(Continued)

FOREIGN PATENT DOCUMENTS

CN     1061741 A    6/1992

(Continued)

OTHER PUBLICATIONS

Final Office Action; U.S. Appl. No. 11/415,193 mailed Oct. 4, 2007.

(Continued)

*Primary Examiner*—Robert B Davis
(74) *Attorney, Agent, or Firm*—DLA Piper LLP US (57) ABSTRACT

A mold clamping apparatus for a die casting machine is provided. The apparatus can include a base, a fixed die plate standing fixedly on an end of an injection side of the base and defining a cavity therein, and a moving die plate arranged so as to proceed and retract on the base facing the fixed die plate and defining a cavity therein. A first versatile main mold can be disposed in the cavity of the fixed die plate and adapted to receive an insert die. Further, a second versatile main mold can be disposed in the cavity of the moving die plate and adapted to receive an insert die.

11 Claims, 5 Drawing Sheets

U.S. PATENT DOCUMENTS

| | | | |
|---|---|---|---|
| 4,684,101 A * | 8/1987 | Wagner et al. | 249/144 |
| 4,803,772 A | 2/1989 | Leverenz | |
| 4,952,131 A | 8/1990 | Shirai et al. | |
| 4,959,002 A * | 9/1990 | Pleasant | 425/192 R |
| 4,993,933 A | 2/1991 | Yoshioka et al. | |
| 5,049,526 A * | 9/1991 | McShane et al. | 29/827 |
| 5,063,648 A | 11/1991 | Yonezawa et al. | |
| 5,114,330 A | 5/1992 | Nielsen | |
| 5,288,222 A * | 2/1994 | Wieser | 425/190 |
| 5,302,105 A | 4/1994 | Bertleff | |
| 5,352,394 A | 10/1994 | Fujita et al. | |
| 5,536,463 A * | 7/1996 | Baccman | 264/219 |
| 5,753,153 A | 5/1998 | Choi | |
| 5,863,474 A | 1/1999 | Ito et al. | |
| 5,871,683 A * | 2/1999 | Schaper et al. | 264/297.2 |
| 5,979,536 A | 11/1999 | Iwamoto | |
| 6,070,643 A | 6/2000 | Colvin | |
| 6,499,986 B1 * | 12/2002 | Saito | 425/190 |
| 6,558,149 B1 * | 5/2003 | Bodmer et al. | 425/192 R |
| 6,702,912 B1 | 3/2004 | Oku et al. | |
| 6,821,104 B2 | 11/2004 | Kubota et al. | |
| 6,843,647 B2 | 1/2005 | Fujita et al. | |
| 6,896,505 B2 * | 5/2005 | Towery et al. | 425/190 |
| 7,204,685 B1 * | 4/2007 | Crain et al. | 425/185 |
| 2003/0138513 A1 | 7/2003 | Matsuura et al. | |
| 2003/0150586 A1 | 8/2003 | Matsuura et al. | |
| 2004/0247740 A1 | 12/2004 | Tsuji et al. | |

FOREIGN PATENT DOCUMENTS

| | | | |
|---|---|---|---|
| CN | 1550311 A | 12/2004 | |
| JP | 2001-054913 | 2/2001 | |

OTHER PUBLICATIONS

Non-Final Office Action; U.S. Appl. No. 11/415,193 mailed Feb. 12, 2008.
Chinese Office Action issued in Application No. 200610106059.4 mailed Jul. 4, 2008.
English Translation of Chinese Office Action issued in Application No. 200610106059.4 mailed Jul. 4, 2008.
Final Office Action; U.S. Appl. No. 11/415,193 mailed Aug. 25, 2008.
Chinese Office Action issued n Application No. 200610106059.4 dated Dec. 19, 2008.
English Translation of Chinese Office Action issued in Application No. 200610106059.4 dated Dec. 19, 2008.
Office Action issued in U.S. Appl. No. 11/415,193 mailed Feb. 10, 2009.
Chinese Office Action issued in CN Appl 200610106059.4 on May 22, 2009.
English Translation of Chinese Office Action issued in CN Appl 200610106059.4 on May 22, 2009.
Final Office Action issued in U.S. Appl. No. 11/415,193, mailed Jun. 12, 2009.
Office Action issued in U.S. Appl. No. 11/953,976 mailed Sep. 23, 2009.
Notice of Allowance issued in U.S. Appl. No. 11/415,193 mailed Sep. 21, 2009.
Partial mechanical translation of JP 2001-054913 published Feb. 2001.
English Abstract of JP 2001-054913 published Feb. 2001.
Notice of Allowance issued in U.S. Appl. No. 11/953,976 mailed Feb. 1, 2010.
Notice of Allowance issued in U.S. Appl. No. 11/415,193 mailed Dec. 23, 2009.

* cited by examiner

PRIOR ART

Fig.5

PRIOR ART

METHOD, APPARATUS, AND SYSTEM FOR CHANGING A MOLD IN A DIE CASTING MACHINE

CROSS REFERENCE TO RELATED APPLICATIONS

This application is a Division of U.S. application Ser. No. 11/415,193 filed May 2, 2006. The entirety of all of the above-listed Applications are incorporated herein by reference.

BACKGROUND OF THE INVENTION

1. Field of the Invention

The present invention relates to a die casting machine or a plastic injection molding machine (hereinafter: die casting machine), and more specifically, relates to the die casting machine provided with a mold clamping apparatus enabling dimensions as small as possible in the direction of opening and closing of a mold, and a method of changing the mold in the die casting machine that is provided with such a mold clamping apparatus.

2. Description of the Related Art

Die casting is a molding method in which melt metal is molded in a mold which is manufactured with high dimensional accuracy. Accordingly, it has a big advantage that a molded article, even with a complicated shape, can be molded in one process, compared with plastic forming such as forging and extruding, or cutting. Therefore, the die casting is suitable for applications where the prices of products are low and the products are mass produced. Such products can have complicated shapes, an can be parts, members, or molded articles of assemblies such as automotive engines that can have mechanical strength.

The mold of the die casting machine which can mold the various kinds of articles mentioned above is often formed by the combination of an insert die defining a cavity corresponding to the shape of each molded article and a main mold fastening and holding the insert die, mainly to reduce production cost, though the cavity can be formed with a single steel material. In the case of the plastic injection molding machine, the mold is also formed by the combination of the insert die and the main mold. Such a main mold, therefore, can be employed with versatility, because it is able to correspond to the insert dies for various kinds of molded articles.

Also, compared with the plastic injection molding machine, the mold for the die casting machine is provided with many core cylinders in the directions of up and down, or right and left, because many cores are used for molding much more complicated molded articles.

Generally, the main mold forming a moving mold mounted on a moving die plate of the die casting machine is provided with more core cylinders than a main mold forming a fixed mold mounted on a fix mold die plate, and includes various constituent elements such as a portion of an extrusion pin for extruding a molded article and pipe lines for supply and drain of the pressurized oil to and from each cylinder, so that it constitutes a complicated formation in which many core cylinders are mounted thereon extended in the up and down, or right and left direction. Accordingly, when each main mold fastening the insert die is mounted on the moving die plate and the fixed die plate respectively, a problem can arise that at least two upper tie bars can disturb the main mold when the at least two upper tie bars are carried in or carried out to and from a working space for mounting by means of a crane, and wherein the working space for mounting is located between the moving die plate and the fixed die plate.

In order to avoid such disturbance, the tie bars are pulled out from both of the die plates, before a mold changing operation. Further, it is necessary to provide cylinders that can be used to only pull out the tie bars in the die casting machine. This can cause a problem in that the dimension of the mold clamping apparatus in the direction of opening and closing of the mold must be increased in order to secure an adequate working space.

Figure 5:
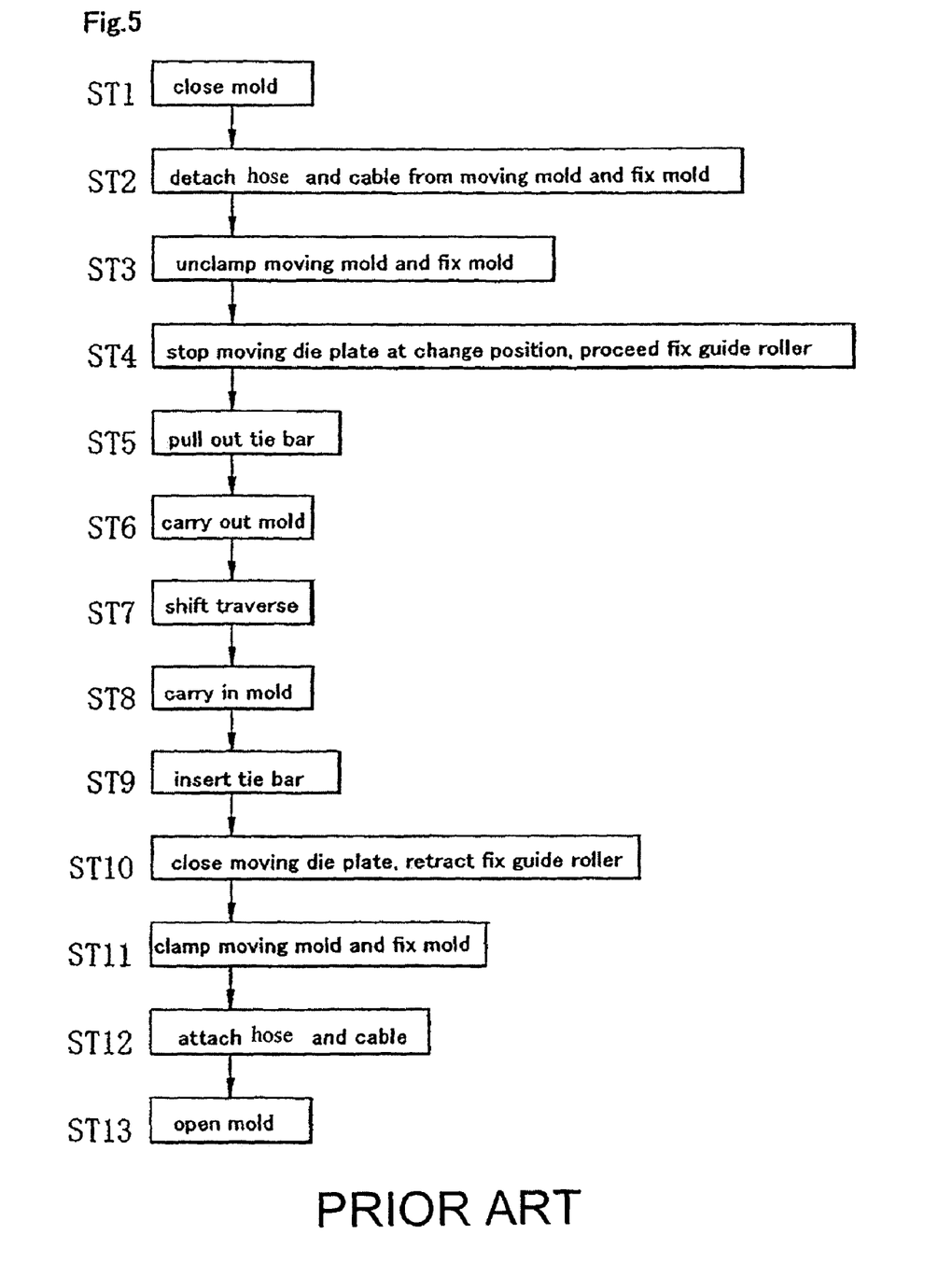
FIG. 5 is a flow chart illustrating a series of conventional sequences for a mold changing operation.

FIG. 5 is a flow chart that illustrates a series of work sequences for a mold changing operation in the prior art described above. As shown in FIG. 5, the tie bar is pulled out from a fixed die plate, in step 5. In step 9, the tie bar is inserted into the fixed die plate. However, there arises a problem in that it takes considerable amount of time to move the tie bar for pulling out the fixed die plate and inserting therein because the tie bar has a large amount of weight.

Also, in the prior art, the main mold and the insert die are carried in or carried out to and from the die casting machine, wherein the main mold and the insert die are attached fixedly on or detached from the opposing surface of each die plate. In order to reduce the total time elapsed for the mold changing operation, the fastening or unfastening of the insert die to or from the main mold can be performed outside the die casting machine prior to and after the mold changing operation.

Figure 4:
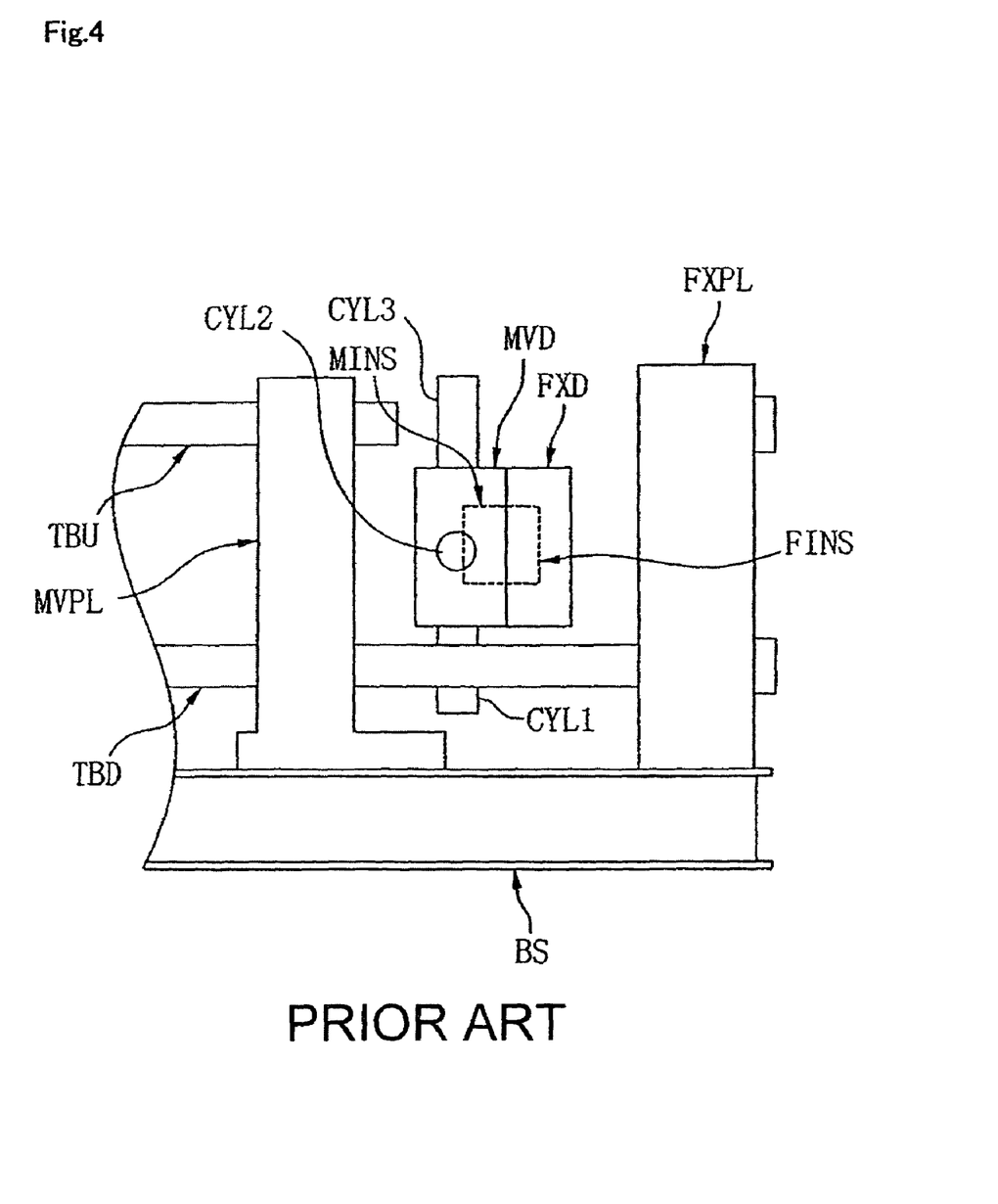
FIG. 4 illustrates a configuration of a pair of molds carried in a mold opened space together with insert dies by a crane configured to describe a substantial portion of the conventional mold change.

FIG. 4 illustrates a configuration wherein a pair of main molds MVD and FXD are carried in a mold open space together with the inserts by means of the crane after the upper tie bars TBU are pulled out. The mold open space is defined as a space formed between the mounting surfaces of a moving die plate MVPL and a fixed die plate FXPL, when the moving die plate MVPL retracts from the fixed die plate FXPL by a predetermined distance.

In FIG. 4, reference code TBU designates the upper tie bar, and reference codes CYL 1, CYL 2 and CYL 3 designate cylinders for the cores which are mounted on the main mold MVD and fastened on the mold mounting surface of the moving die plate MVPL. Reference codes MINS and FINS are a pair of insert dies fastened in the main mold MVD and the main mold FXD.

In FIG. 4, a die length is defined as the distance between both of the mold mounting surfaces when the moving die plate MVPL reaches a mold closing position by moving in the right direction such that the main molds MVD and FXD are each fastened on the mold mounting surface of the moving die plate and the fixed die plate, respectively. In FIG. 4, therefore, the die length is determined, in the direction of the tie bar axis, as the sum of the lengths of the main molds MVD and FXD. This die length is inherent in the combination of main molds MVD and FXD. That is, there necessarily exists a length inherent in another pair of main molds which differs in length from one pair of main molds. Accordingly, the mold closing position can not be set to less than the die length inherent in the each of the main molds.

In a conventional type of die casting machine, a toggle mechanism and a link housing (not shown) are mostly employed. A conventional type of die casting machine can also employ an arrangement of a ram cylinder to clamp molds and a template to fasten the cylinder. In these types of die casting machines, the dimension of a base BS, i.e., the length of the mold clamping apparatus, can become relatively large in the opening and closing directions of the molds. Also, because it is necessary to extend the tie bar to a location of the link housing or the template, there arises a problem that the tie bar must be elongated and thickened.

Further, in medium or large size die casting machines, the die length of the molds can be large and the weight can range between a few tons to more than ten tons. More specifically, bending moment always acts downward on the moving die plate MVPL which moves on a guide due to forming a cantilever that could cause the moving die plate MVPL to turn over or tilt.

SUMMARY OF THE INVENTION

Therefore, the inventors of the present invention have devoted themselves to analyze, study, examine and make exertion to solving the problems discussed above. As a result, it is determined that in the conventional systems, the main molds are fastened on the mold mounting surfaces of the die plates. It is thus determined that the various problems in the conventional systems can be solved by placing the main molds inside the respective die plates.

Accordingly, in a first embodiment of the present invention, there is provided an apparatus for a die plate for a die casting machine that is capable of minimizing the die length.

In a second embodiment of the present invention, there is provided a mold clamping apparatus for the die casting machine equipped with the die plate.

Further, in a third embodiment of the present invention, there is provided a method of changing a mold in the die casting machine using the mold clamping apparatus equipped with the die plate.

Further, in a fourth embodiment of the present invention, there is provided a method of changing a moving die plate of the mold clamping apparatus equipped with the die plate in the die casting machine.

Further, in a fifth embodiment of the present invention, there is provided a changing system for implementing the method of changing the moving die plate.

Other objects of the present invention will be apparent in the following description.

To achieve the first embodiment of the present invention, the die plate for the die casting machine is constituted such that it retains the versatile main mold by fastening and holding an insert die detachably.

The versatile main mold can be configured such that it is detachably fastened and held inside the die plate. Also, the versatile main mold can be configured such that it is incorporated integrally inside the die plate, and at least a portion of a constituent member of the versatile main mold is configured to be a mechanical constituent member of the die plate. Further, the die plate can be a moving die plate.

To achieve the second embodiment of the present invention, the mold clamping apparatus for the die casting machine is constituted such that it includes:
  a) a base,
  b) a fixed die plate standing fixedly on an end of an injection side of the machine,
  c) a moving die plate arranged so as to proceed and retract on the base facing the fixed die plate,
  d) a guide means arranged on the base in order to guide proceeding and retracting movement of the moving die plate,
  e) a first drive means for allowing the moving die plate to proceed and retract on the guide means,
  f) a tie bar passing through a portion neighboring to a corner of each die plate and acts so as to hold clamping state to both of the die plates, and
  g) a second drive means for producing clamping force between the fixed die plate and the moving die plate,
  said each die plate being formed to place a versatile main mold inside, which fastens and holds an insert die detachably.

The first drive means can be provided with a threaded shaft rotated by a servomotor mounted on the base, a nut which slides on the guide means and screws together with the threaded shaft, and a fastening member fixedly fastened at a side face of the moving die plate Also, the second drive means can be provided with a clamp cylinder formed at a portion in the fixed die plate through which the tie bar passes, a first fastening means provided in the fixed die plate to fasten one end portion of the tie bar passing through the fixed die plate and a second fastening means provided in the moving die plate to fasten the other end portion of the tie bar passing through the moving die plate.

To achieve the third embodiment of the present invention, a method of changing a mold in a die casting machine is constituted such that the die casting machine is provided with a mold clamping apparatus including a base, a fixed die plate standing fixedly on an end of an injection side of the machine, a moving die plate arranged so as to proceed and retract on the base facing the fixed die plate, a guide means arranged on the base in order to guide proceeding and retracting movement of the moving die plate, a first drive means for allowing the moving die plate to proceed and retract on the guide means, a tie bar passing through a portion neighboring to a corner of each die plate and acts so as to hold clamping state to both of the die plates, and a second drive means for producing clamping force between the fixed die plate and the moving die plate, each die plate being formed to place a versatile main mold inside, which fastens and holds an insert die detachably, the method includes the steps of:

a) forming a mold opened space between the moving die plate and the fixed die plate by retracting to a predetermined position the moving die plate among the die plates placing respectively a first versatile main mold fastening a first insert die, which corresponds to a first level of versatility and constitutes a first mold in the state before mold changing operation, b) bringing out each of the first insert dies to the mold opened space by unfastening the first insert die from the first versatile main mold, c) carrying out each of the first insert dies brought out to the mold opened space to a predetermined position, independently or in the form of a pair of first insert dies, d) preparing a pair of second insert dies corresponding to the first level of versatility to a second predetermined position in order to form a second mold in the state after mold changing operation, e) in the succeeding sequence, carrying in the pair of second insert dies waiting at the second predetermined position to the mold opened space, f) forming the second mold by separating the pair of second insert dies in the mold opened space and then fastening the separated second insert to each of the first versatile main mold, and g) proceeding the moving die plate to a mold closing position after forming the second mold.

Further to achieve the fourth embodiment of the present invention, a method of changing a moving die plate of a mold clamping apparatus provided with a die plate is constituted such that, changing a moving die plate of a die casting machine in a mold clamping apparatus includes a base, a fixed die plate standing fixedly on an end of an injection side of the machine, a moving die plate arranged so as to proceed and retract on the base facing the fixed die plate, a guide means arranged on the base in order to guide proceeding and retracting movement of the moving die plate, a first drive means for allowing the moving die plate to proceed and retract on the guide means, a tie bar passing through a portion neighboring to a corner of each die plate and acts so as to hold clamping state to both of the die plates, and a second drive means for producing clamping force between the fixed die plate and the moving die plate, said each die plate being formed to place a versatile main mold inside, which fastens and holds an insert die detachably, and the method includes the steps of:

a) forming a mold opened space between the moving die plate and the fixed die plate by retracting to a first predetermined position on the base a first moving die plate arranged on the base and placing a first versatile main mold inside corresponding to a first level of versatility using the first drive means, in the state before moving die plate changing operation, b) bringing out each of the insert dies to the mold opened space by unfastening the respective insert die from the versatile main mold in each die plate, c) carrying out each of the insert dies brought out to the mold opened space, independently or in the form of a pair of first insert dies, d) then, further retracting the first moving die plate to a second predetermined position, e) preparing a second moving die plate, which places a second versatile main mold inside corresponding to a second level of versatility differing from the first level of versatility, to a predetermined waiting position, f) in the succeeding sequence to further retracting, carrying out the first moving die plate from the base, g) then, carrying in the second moving die plate prepared in the predetermined waiting position to the second predetermined position.

Further to achieve the fifth embodiment, a changing system of a moving die plate to implement the method of changing a moving die plate of a mold clamping apparatus provided with a die plate according to the present invention is constituted such that the changing system includes:

a) a first storage means for storing one or a plurality of moving die plates placing a versatile main mold inside corresponding to different levels of versatility, b) a second storage means for storing a plural pair of insert dies formed so as to use in accordance with each of the main molds with versatility provided in the moving die plate, c) a first conveying carriage for receiving the first moving die plate from the second predetermined position on the base in the step of carrying out the first moving die plate from the base, d) a second conveying carriage for carrying in the second moving die plate prepared in the predetermined waiting position in the step of carrying in the second moving die plate prepared in the predetermined waiting position to the second predetermined position, e) a first run for the first conveying carriage and the second conveying carriage which is arranged at least between a vicinity of the first storage means and a vicinity of the second predetermined position, and f) a conveying control unit for controlling movement of the first and second conveying carriages on the first run.

The waiting position for the second moving die plate can be located within the first storage means.

Also, the first run can be provided with a bypass arranged in the vicinity of the base, which is available as the waiting position.

Further, the moving die plate stored in the first storage means includes a first type of the moving die plate which places a versatile main mold to be fastened and held detachably, and a second type of the moving die plate which places said versatile main mold to be incorporated integrally inside, and at least a portion of a constituent member of the versatile main mold, forming a mechanical constituent member of the moving die plate, or includes either one of the first type and the second type.

Further, a storage means of the first storage means for storing the first type of the moving die plate is located at a different position from that of a storage means of the first storage means for storing the second type of the moving die plate.

Further, the system is provided with an insert die mounting means which enables a pair of insert dies to carry in and carry out through a side portion of the die casting machine. Also, the first, second and third conveying carriages are a type of automotive carriage.

According to an embodiment of the present invention, due to the main mold being placed inside the die plate, the die length can be reduced to as small as possible regardless of the type of the mold clamping apparatus of the die casting machine. Thus, issues relating to over-turning or tilting of the die plate due to the weight of the main mold including the insert die can be eliminated.

According to another embodiment of the present invention, the mold clamping cylinder can be formed at the side of the fixed die plate. The work required for pulling out and inserting the tie bar before and after the mold changing operation can be reduced. Accordingly, the cylinder for: pulling out the tie bar may be eliminated. Further the length of the mold clamping apparatus in the mold opening and closing direction can be ranged substantially within a range of movement of the moving die plate. Thus, the tie bar can be shortened, thereby reducing the production cost of the mold clamping apparatus and making it easy to maintain.

According to an embodiment of the present invention, because the mold changing operation can be implemented by carrying in and carrying out one pair of insert dies, it is possible to save the time required conventionally for pulling out and inserting the tie bar, thereby simplifying the mold changing operation.

According to another embodiment of the present invention, the moving die plate can be removed from the mold clamping apparatus by moving it to the second predetermined position on the base without pulling out the tie bar. Further, it is possible to change the moving die plate to the second predetermined position within the mold clamping apparatus by introducing a moving die plate that is placed the proximally to the versatile main mold.

According to another embodiment of the present invention, because the first storage means stores a plurality of moving die plates with different ranges of insert dies it can hold, it is possible to select a moving die plate by placing in advance a versatile main mold having the desired range of insert dies in the next molding operation, and to allow the moving die plate to wait in the vicinity of the mold clamping apparatus in the state of mounting it on the conveying carriage, thereby enabling the change of the moving die plate to terminate in a short time.

DETAILED DESCRIPTION OF THE INVENTION

The preferred embodiment of the present invention will be explained below, referring to attached drawings of FIGS. 1 to 3.

Figure 1:
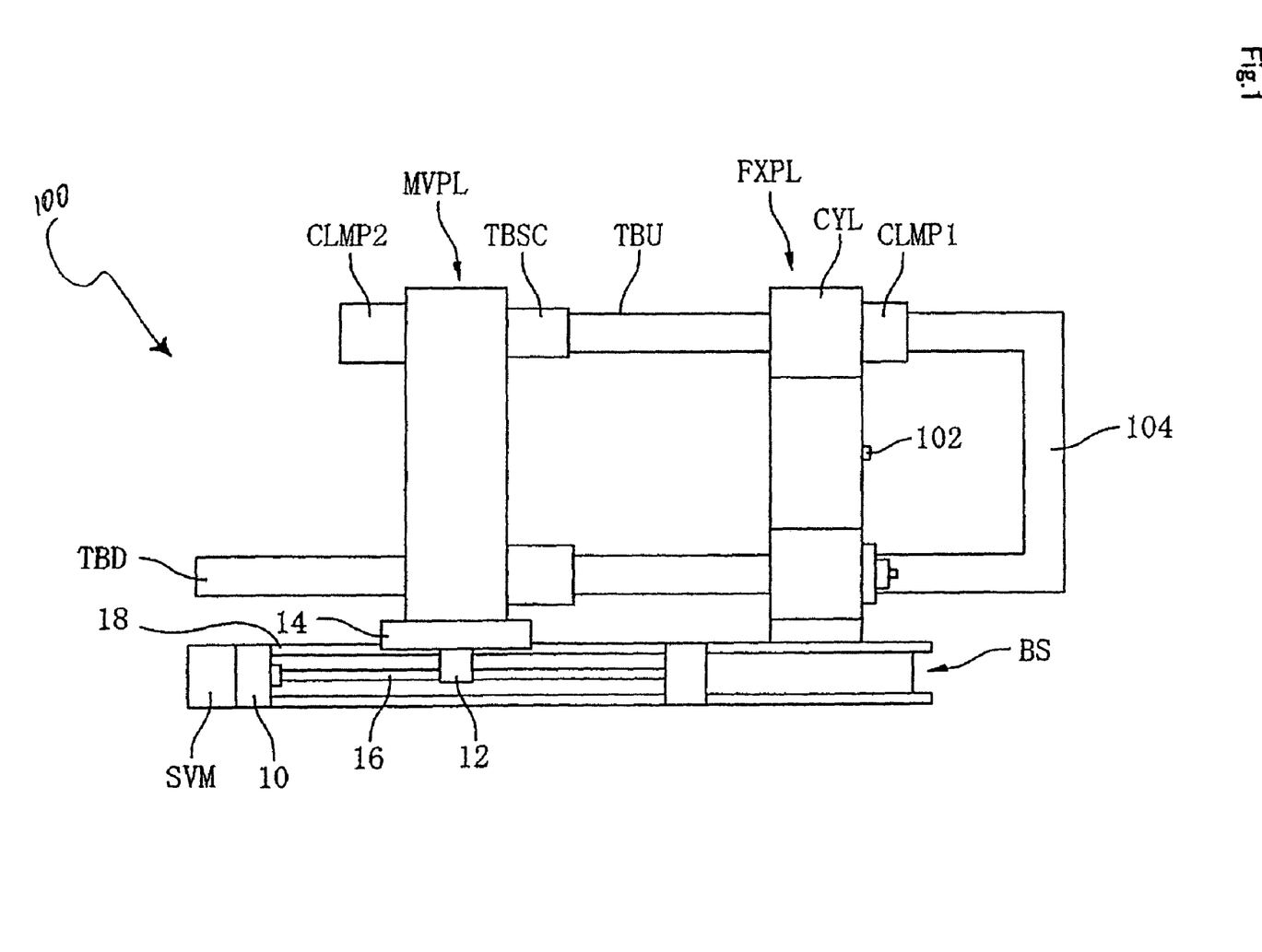
FIG. 1 illustrates a side view illustrating whole of a mold clamping apparatus of a die casting machine according to the present invention.

FIG. 1 is a side view illustrating a mold clamping apparatus 100 of a die casting machine according to the present invention.

In FIG. 1 there is provided a fixed die plate FXPL standing fixedly at the right end portion of a base BS. On the lateral face of injection side of the fixed die plate FXPL, there is mounted a U-shaped frame 104. An injection plunger rod (not shown) is inserted into a sleeve 102 through a hole provided in the vertical portion of the frame 104. A moving die plate MVPL is arranged opposing the fixed die plate FXPL. Two upper tie bars TBU and Two lower tie bars TBD are arranged on both of the die plates in a way that those tie bars pass through at each corners of the respective die plates. A reference code TBSC is an engaging portion with the moving die plate MVPL, which is provided with a thread or a square groove in the circumferential surface. The engaging portion TBSC is engaged with an engaging member provided in a clamping device CLMP2 mounted on the side of the moving die plate MVPL opposed to the fixed die plate when the tie bar TBU and each die plate are in a predetermined phase related position.

A reference code CLMP1 is a clamping device provided with an engaging member inside which engages with an engaging portion such as a thread or a square groove formed at an end portion on the fixed die plate side of the tie bar TBU passing through the fixed die plate FXPL.

A reference code CYL is a mold clamping cylinder formed at a portion of the fixed die plate through which the tie bar TBU passes. The tie bar TBU is used as a piston and a piston rod for the mold clamping cylinder CYL. In addition, though a clamping device for the lower tie bar TBU is not shown and only an end portion on the fixed die plate side of the tie bar TBD is shown, a similar clamping device is provided for the tie bar TBD. Also, a clamping device CLMP2 for the moving die plate MVPL is provided in a lower portion of the moving die plate for the tie bar TBD.

A reference numeral 10 is a mounting provided in the side of the base BS on which a servomotor SV is mounted. A reference numeral 16 is a ball screw shaft. A rotary encoder is mounted on the axis of the servomotor SV (not shown).

A reference numeral 12 is a nut screwed with the thread of the ball screw shaft, which is mounted on a connecting member 14. This connecting member 14 is slidably arranged on a guide 18 which bottom portion is arranged on the base BS. The connecting member 14 is provided with a side wall portion extending vertically from the bottom portion which is fastened to a side of the moving die plate MVPL.

These components 10, SVM, 16, 14, and 18 are also arranged on the base BS at the counter side to the front side of the machine where an operator usually stands. These components constitute a first drive means of the present invention. Also, the clamping devices CLMP1 and CLMP2 constitute a second drive means of the present invention.

The clamping device CLMP1 can reach the state of allowing an engage portion of the engaging member of the clamping device CLMP1 to mate the thread or the square groove formed at the end portion of the tie bar TBU, when the end face of the tie bar TBU on the fixed die plate side contacts with a member provided in the clamping device and the phase between the engage portion and the thread or the square groove coincides.

And then, by means of actuating the mold clamp cylinder CYL and moving the tie bar TBU in the direction of the axis in the state that the clamping device CLMP1 mates with the tie bar TBU, it is possible to adjust in a way that a phase of the thread or the square groove TBSC of the tie bar passing through the moving die plate MVPL coincides with a phase of the engage portion of the engaging member provided in the clamping device CLMP2. In addition, the inventors have already studied in detail, the mechanisms as to the mold clamping cylinder CYL and the clamping device CLMP1.

Accordingly, the engagement in the clamping device CLMP1 can be released only when a mold closing position of the moving die plate is changed, associated with the mold changing operation. On the contrary, the engagement in the clamping device CLMP2 can be released each time when the moving die plate MVPL is proceeded and retracted by the first drive means. The outer shape of a versatile main mold MVD placed inside the moving die plate MVPL is illustrated in FIG. 2.

Figure 2:
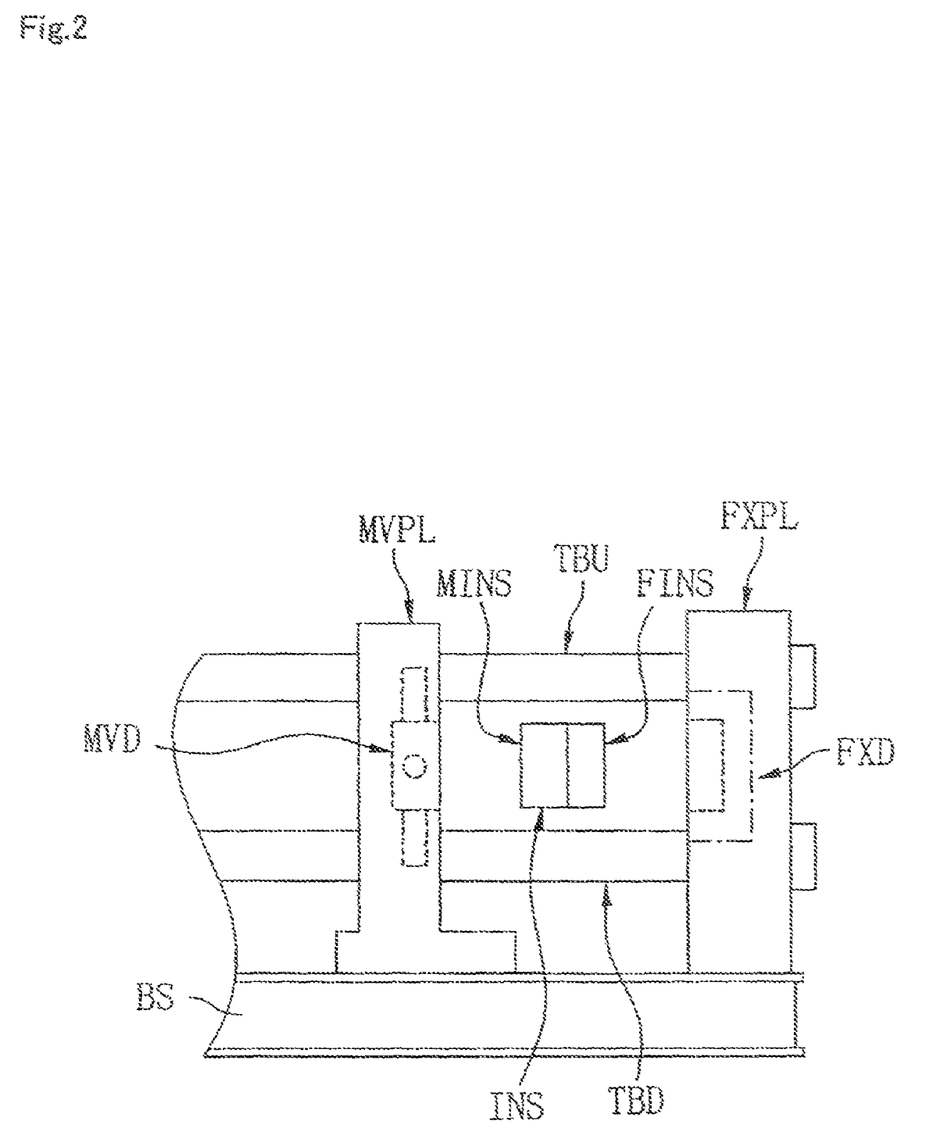
FIG. 2 illustrates a simplified view of mold changing in a mold clamping apparatus providing a die plate according to the present invention.

FIG. 2 is a simplified illustration of a mold changing operation in the mold clamping apparatus provided with a die plate according to the present invention. As shown in FIG. 2, main molds with versatility MVD and FXD are placed inside moving die plate MVPL and fixed die plate FXPL, respectively. As illustrated in the figure, a pair of insert die INS which is formed by the insert dies FINS and MINS is carried in to a mold opened space without disturbing tie bar TBU or TBD located in an upper portion or a side portion. The pair of insert die is separated and fastened to each of the main molds with versatility MVD and FXD. The die length becomes zero or very small when the moving die plate positions at a mold closing position, and as a result, the dimension of the mold clamping apparatus in the direction of mold opening and closing can be shortened. Also, there is no tilting in the moving die plate MVPL and the fixed die plate FXPL due to the total weight that results when the main molds with versatility are fastened on the opposed surface of each die plate, as implemented conventionally.

Each insert dies MINS and FINS of the pair of the insert die INS can be carried in independently.

Figure 3:
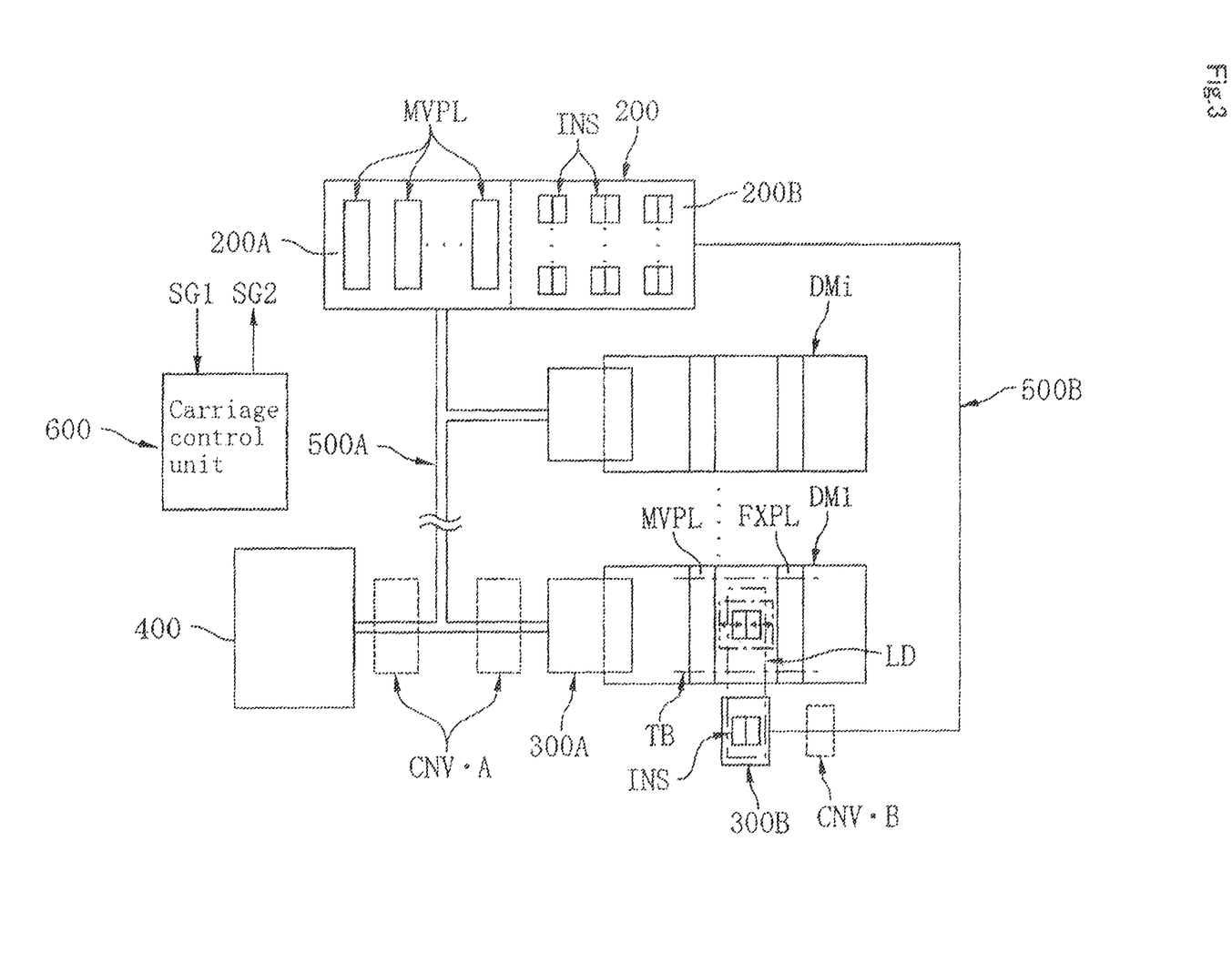
FIG. 3 illustrates an arrangement of a structure for changing system of a moving die plate according to the present invention.

Though the pair of insert die INS can be carried in and carried out to and from the mold opened space using a crane, as shown in FIG. 3, it is also possible to transfer the pair of insert die INS in a way that using a conveying carriage CNV.B for only the insert die INS, a requested insert die INS stored in a storage 200 at a predetermined location is conveyed to a station 300B located aside the die casting machine DM1, and then the insert die INS on the carriage CNV.B is transferred to an insert die mounting means LD from the carriage CNV.B. In the case the insert die mounting means LD can be inserted into the mold opened space from the lateral direction.

This insert die mounting means LD can be provided with, for example, rolling means such as guide rails for guiding the insert die and rollers. Further the insert die mounting means LD can be provided with a guide means which guides the insert die positioned in a predetermined position of the mold opened space so that it moves in the direction of each die plate.

Though the detailed mechanism is not shown about attaching and fastening of the insert die INS to the versatile main mold placed inside the moving die plate MVPL, it is possible to adopt, for example, a mechanical combining means such as a pull stud and a screw or a hydraulic mechanism in combination with the mechanical combining means.

In addition, when, inserting the insert die MINS into the versatile main mold MVD, the operator can manually plug the insert die MINS. But, it is also possible to pull in and pull out the insert die MINS by providing a pulling in and out means at the main mold MVD.

It is possible, but not effective that as to the versatile main mold MVD placed inside the moving die plate MVPL, a single versatile main mold corresponds to all the insert die used in the die casting machine. Namely, the main mold can be classified by three ranks of large, middle and small in accordance with the size of molded articles which the die casting machine can mold, and the main molds in accordance with each ranks of large, middle and small can be prepared. Thus, by setting kinds or ranks for the versatile main mold it is possible to avoid forming the insert die to be needlessly large size, because material for the insert die is expensive In the present invention the type of the versatile main mold is defined by the range of insert dies it can hold. As mentioned above, this range can be defined by not only the size of the insert dies, but by also, the complexity of the mechanism in the versatile main mold. Also, the range can be defined by combination of the size and the complexity.

On the other hand, the versatile main mold FXD placed inside the fixed die plate FXPL, as described previously, is usually formed much simpler than the versatile main mold MVD of the moving die plate MVPL. Therefore, the versatile main mold FXD need not hold the same range of insert dies as the versatile main mold MVD. That is, the versatile main mold FXD can be formed to hold a much greater range of insert dies than versatile main mold MVD. Though the insert die. FINS inserted and fastened can be formed to correspond to a particular main mold FXD, the insert die FINS can correspond to different main molds FXD employing an adjusting member among the insert die FINS and the main mold FXD. The adjusting member can be prepared so as to correspond to each different main mold FXD.

Next, a configuration will be explained for placing the versatile main mold MVD inside the moving die plate MVPL.

This versatile main mold. MVD can be classified by two embodiments. In one embodiment, the versatile main mold MVD can be formed so as to easily separate from the moving die plate MVPL by unfastening the main mold MVD itself though it is usually fastened and held in the moving die plate MVPL. In another embodiment, at least a portion of a constituent member forming the versatile main mold MVD is a mechanical constituent member of the moving die plate MVPL, which is incorporated integrally, thereby structurally constituting a part of the moving die plate MVPL. In such embodiments of the present invention, the moving die plate placing the former versatile main mold is defined as a first type of moving die plate and the moving die plate placing the latter versatile main mold is defined as a second type of moving die plate.

As illustrated in FIG. 2, when the moving die plate MVPL is the first type, even if the main mold is unfastened, it is difficult to remove the main mold from the mold opened space due to the tie bars TBU and TBD. Also, when the versatile main mold MVD is defined as the second type of the moving die plate, it is even more difficult to remove the main mold from the mold open space.

In the present invention, when changing a main mold defined by a specified range and placed inside the first type of moving die plate to another main mold defined by a different range, the below described procedure can be implemented. That is, after the insert die is pulled out and then the engagement with the tie bar TBU in the clamping device CLMP2 is released, the moving die plate MVPL as shown in FIG. 1 is moved further to the left, i.e., to the end portion of the base BS which is a predetermined retracting position by the first drive means equipped with the servomotor SVM. Then the moving die plate MVPL is transferred on a first conveying carriage waiting at a first position in the vicinity of the base end portion, thereby removing the moving die plate from the mold clamping apparatus of the die casting machine. Then, a second conveying carriage can mount another moving die plate and place a main mold with a predetermined range of insert dies, and then, can preliminarily wait at a different second position in the vicinity of the base end portion. Such second conveying carriage can also be moved to the first position and then transfer another moving die plate on the base, to thereby change the moving die plate.

FIG. 3 illustrates an arrangement of a structure for a changing system of a moving die plate according to the present invention. In FIG. 3 reference codes DM1 and DM2 are die casting machines provided with a mold clamping apparatus according to the present invention. Reference numeral 200 refers to storage means including a first storage means 200A which stores a plurality of moving die plates, and a second storage means 200B which stores a plurality pair of insert die INS.

Though the first storage means 200A can store both of the first type and the second type of the moving die plates, the first type of the moving die plate may be stored in a storage means 400 which is located independently.

Reference numeral 500A corresponds to a run for a conveying carriage CNV.A which mounts the moving die plate MVPL. This run 500A is provided with a bypass run for accessing the storage means 400. On the bypass run the conveying carriage CNV.A for waiting are located as shown in the FIG. 3. Reference numeral 300A corresponds to a station for transferring the moving die plate, arranged in the vicinity of the end portion of the base of the mold clamping apparatus. In FIG. 3 the first conveying carriage of CNV.A is positioned at the right side of the second conveying carriage of CNV.A positioned at the left side, and does not yet mount the moving die plate. So, the first conveying carriage approaches the station 300A in which it receives the moving die plate for carrying out that preliminarily waits.

Reference numeral 500B is a run for the insert die INS. This run 500B is arranged between the second storage means 200B and the station 300B located in the vicinity of the mold opened space on one side of the mold clamping apparatus of the die casting machine DM1. Reference code CNV.B is a third conveying carriage which mounts the insert die INS and conveys on the run 500B. The details relating to carrying in and carrying out the insert die between the insert mounting means LD and each versatile main mold is omitted because such details have been previously described above.

Reference numeral 600 is a carriage control unit for controlling conveying position of the conveying carriages CNV.A and CNV.B. Each conveying carriage may be an automotive carriage or a type of carriage driven by an external force such as a chain and hydraulic cylinder. Reference code SG1 is a receiving signal such as the conveying position from each conveying carriage, and reference code SG2 is a control signal supplied to each conveying carriage.

Though a preferred embodiment of the present invention is explained in the case of the die casting machine, it should be understood that a person with ordinary skilled in the art could easily apply the present invention to the mold clamping apparatus of the plastic injection molding machine provided with a similar mold clamping apparatus.

What is claimed is:

1. A die casting machine, comprising:
a die plate having corners and defining a cavity therein;
tie bars that pass through the corners of the die plate; and
a versatile main mold disposed in the cavity and constructed and arranged to receive any of a plurality of insert dies having a range of different sizes, each insert die defining a cavity corresponding to the shape of an article to be molded, the versatile main mold configured to detachably fasten and hold each of the insert dies.

2. A die plate according to claim 1, wherein said versatile main mold is detachably fastened and held in the die plate.

3. A die plate according to claim 1, wherein said versatile main mold is incorporated integrally inside the die plate and at least a portion of a constituent member of the versatile main mold forms a mechanical constituent member of the die plate.

4. A die plate according to claim 1, wherein said die plate is a moving die plate.

5. A die casting machine, comprising:
a fixed die plate having corners and defining a cavity therein and having a clamp cylinder formed at a portion in the fixed die plate;
tie bars that pass through the corners of the fixed die plate;
a first versatile main mold disposed in the cavity of the fixed die plate and constructed and arranged to receive any of a plurality of insert dies having a range of different sizes, each insert die defining a cavity corresponding to the shape of an article to be molded, the versatile main mold configured to detachably fasten and hold each of the insert dies;
a moving die plate having a fastening member fixedly fastened at a side face of the moving die plate, the moving die plate having corners and defining a cavity therein, where the tie bars pass through the corners of the moving die plate;
a second versatile main mold disposed in the cavity of the moving die plate and constructed and arranged to receive any of a plurality of insert dies having a range of different sizes, each insert die defining a cavity corresponding to the shape of an article to be molded, the versatile main mold configured to detachably fasten and hold each of the insert dies;
a first drive means for allowing the moving die plate to proceed and retract on a guide, the first drive means including the fastening member; and
second drive means for producing clamping force between the fixed die plate and the moving die plate through the tie bars, the second drive means including the clamp cylinder;
wherein the die casting machine has a reduced die height when the moving die plate is positioned at a mold closing position.

6. A moving die plate according to claim 5, wherein said versatile main mold is detachably fastened and held in the die plate.

7. A fixed die plate according to claim 5, wherein said versatile main mold is detachably fastened and held in the die plate.

8. A moving die plate according to claim 5, wherein said versatile main mold is incorporated integrally inside the die plate and at least a portion of a constituent member of the versatile main mold forms a mechanical constituent member of the die plate.

9. A fixed die plate according to claim 5, wherein said versatile main mold is incorporated integrally inside the die plate and at least a portion of a constituent member of the versatile main mold forms a mechanical constituent member of the die plate.

10. The die casting machine of claim 5, wherein the die height is substantially zero when the moving die plate is positioned at a mold closing position.

11. The die casting machine of claim 5, wherein the first versatile main mold and the second versatile main mold each have a length, and the die height is less than the sum of the lengths of the first versatile main mold and the second versatile main mold when the moving die plate is positioned at a mold closing position.

* * * * *